United States Patent [19]

Menault et al.

[11] 4,377,648

[45] Mar. 22, 1983

[54] CELLULOSE-POLYACRYLONITRILE-DMSO-FORMALDEHYDE SOLUTIONS, ARTICLES, AND METHODS OF MAKING SAME

[75] Inventors: Jacques Menault, Charbonnieres-Les-Bains; Henry Rodier, Sainte-Foy-Les-Lyon, both of France

[73] Assignee: Rhone-Poulenc-Textile, Paris, France

[21] Appl. No.: 147,221

[22] Filed: May 6, 1980

[30] Foreign Application Priority Data

May 14, 1979 [FR] France .................................. 79 12383
Mar. 13, 1980 [FR] France .................................. 80 05963

[51] Int. Cl.³ .......................... C08L 1/02; D01D 5/06; D01F 6/18
[52] U.S. Cl. ................................ 524/35; 106/163 R; 264/178 F; 264/182; 264/203; 428/374; 428/522; 428/532
[58] Field of Search ............ 106/163 R; 260/17.4 CL; 524/35

[56] References Cited

U.S. PATENT DOCUMENTS 4,012,346  3/1977  Makiyama et al. ............... 260/17 A

OTHER PUBLICATIONS

*Chemical Abstracts,* 87:137510g (1977).

*Primary Examiner*—James C. Cannon
*Attorney, Agent, or Firm*—Murray and Whisenhunt

[57] ABSTRACT

New polymer solutions, processes for producing such solutions, shaped articles made from these solutions, and process of making such articles, are disclosed. The polymer solutions contain cellulose having a degree of polymerization of at least 200, an acrylonitrile polymer, dimethylsulphoxide and formaldehyde. The weight ratio of cellulose/acrylonitrile polymer is 0.05 to 1, preferably 0.1 to 1, the weight ratio of formaldehyde/cellulose is 0.2 to 2, and the total concentration of polymer in the solution is 12 to 30% by weight, preferably 18 to 26% by weight.

The solutions of the present invention are particularly suitable for the production of filaments consisting of fibrils orientated approximately along the axis of the fibre and closely interwoven, with the cellulose macromolecules being partially involved in a crystal lattice characteristics of cellulose II. The filaments possess valuable properties for use in textiles, such as, for instance, in garments.

7 Claims, 5 Drawing Figures

CELLULOSE-POLYACRYLONITRILE-DMSO-FORMALDEHYDE SOLUTIONS, ARTICLES, AND METHODS OF MAKING SAME

The present invention relates to shapable solutions of cellulose and acrylonitrile polymers, which can be shaped and converted to yarns, fibres, films, membranes, coatings and the like, to a process for the preparation of such solutions, to yarns and fibres obtained from these solutions, and to the process for producing such yarns and fibres.

BACKGROUND OF THE INVENTION

East German Pat. No. 94,493 discloses solutions which can be converted into yarns and films. The solutions are prepared by dissolving cellulose and another polymer, such as polyacrylonitrile, in aqueous zinc chloride solutions, having a zinc chloride concentration of 30–70%, and optionally containing a minor amount of an acid, such as formic acid, phosphoric acid, hydrochloric acid or the like. A disadvantage of this technique is that solutions based upon zinc chloride cause hydrolysis and therefore degradation of the cellulose polymer.

Published Japanese Patent Application No. 71/27,573, published on Aug. 10, 1971, discloses the preparation of solutions or dispersions of mixtures of cellulose and polymers such as acrylonitrile polymers in sulphur dioxide, in the presence of a tertiary or secondary amine. Because of the particular compounds used in the disclosed process, it is necessary when using such solutions to take particular precautions as regard hygiene and safety; and the solutions of this published Japanese Patent Application cannot easily be used in industrial processes.

An article by Raymond B. Seymour and Earl J. Johnson in "Struct. Solubility Relat. Polym. (Proc. Symp.), 1976, pages 241–244 (published 1977)" describes the possibility of obtaining fibres of polyacrylonitrile and cellulose from solutions. However, the starting cellulose solutions have a concentration of less than 2.5%, and it is not possible to obtain fibres having valuable textile properties from such solutions, so that the article does not lead to a process suitable for industrial production.

East German Pat. No. 89,003 teaches the preparation of stable dispersions by introducing microcrystalline cellulose into a solution of another polymer. The cellulose introduced in this manner is still in a particulate state at the fibre stage, and does not contribute textile properties to the fibres.

SUMMARY OF THE INVENTION

The present invention in one aspect includes shapable or spinnable solutions which comprise cellulose, acrylonitrile polymer, formaldehyde, and dimethylsulphoxide wherein the weight ratio of cellulose/acrylic polymer is 0.05 to 1, preferably 0.1 to 1, the weight ratio of formaldehyde/cellulose is 0.2 to 2, and the total polymer concentration in the solution is from 12 to 30% by weight, preferably 18 to 26%. The cellulose has a degree of polymerisation of at least 200. Fibres and filaments prepared from the solutions of the present invention have both of the polymers in the form of fibrils closely intermingled and substantially orientated along the fibre axis. The macromolecules of cellulose are partially bound in a crystalline network which is characteristic of cellulose II. When the preferred weight ratio of cellulose/acrylic polymer is between 0.1 and 1, both polymeric constituents form a tri-dimensional endless network, whereas for a ratio of cellulose/acrylic polymer of between 0.05 and 0.1, the acrylic component alone forms an endless network, with the cellulose polymer being in the form of discontinuous fibrils. To obtain yarns and fibres, it is preferred to utilize solutions having a polymer concentration of between 18 and 26% by weight, a water content which is less than or equal to 5,000 ppm, and a weight ratio of cellulose/acrylic polymer of between 0.1 and 1.

The present invention also relates to a process for preparing the shapable solutions of the present invention, by adding the acrylonitrile polymer in powder form to a solution, in a mixture of dimethylsulphoxide and formaldehyde, of cellulose having a degree of polymerisation of at least 200 and previously dried. The total polymer concentration is between 12 and 30%, and the weight ratio of cellulose/acrylic polymer is between 0.05 and 1. The cellulose/solution may be in the form of a powder previously crystallised by cooling a solution to a temperature below 17° C., preferably of between 0° and 5° C., and in this case the two polymers are mixed, for example in a malaxating extruder, at a temperature between 90° and 150° C., preferably between 100° and 135° C.

It is also possible to obtain the solutions of the present invention by separately dissolving the acrylic polymer in dimethylsulphoxide and the cellulose in a mixture of dimethylsulphoxide and formaldehyde, and then mixing the two solutions while stirring, with the weight ratio of cellulose/acrylic polymer being between 0.05 and 1. This latter process is generally preferred for the preparation of solutions having a total polymer concentration of between 12 and 18% by weight.

The present invention also relates to filaments, fibres and yarns produced from the solutions of the present invention. These fibres, filaments and yarns are based on cellulose and acrylic polymers in a weight ratio of cellulose/acrylic polymer of between 0.05 and 1. In these filaments, fibres and yarns each polymer is in the form of fibrils orientated approximately along the axis of the fibre and closely interwoven with one another. The fibrils of the acrylic constituent form a continuous three-dimensional system over the whole length of the fibre, whereas the cellulose macromolecules are partially involved in a three-dimensional crystal lattice characteristic of cellulose II. Preferably the weight ratio of cellulose/acrylic polymer is between 0.1 and 1, and the cellulose fibrils also form a continuous three-dimensional fibrillar system. The higher the proportion of cellulose, the denser the system, with the fibrils of the two constituents being intimately intermixed.

The yarns and fibres produced according to the present invention possess a water retention capacity of at least 20, preferably at least 30, as determined in accordance with DIN Standard Specification 53-814.

The present invention also relates to a process for producing the yarns and fibres of the present invention, by wet spinning the solutions of the present invention. The total polymer concentration in these solutions is between 12 and 30%, and the solutions are spun into a coagulating bath consisting of 25 to 80% by volume of water and 75 to 20% by volume of dimethylsulphoxide. The coagulating bath is maintained at between 0° and 40° C., and the filaments may thereafter be subjected to orientation and solvent removal using standard processing conditions.

DETAILED DESCRIPTION OF THE INVENTION

The cellulosic polymer used in the solutions of the present invention may be cellulose I, referred to as native cellulose, of any suitable origin, for example, cotton linters or wood pulp, or the cellulose may be cellulose II possessing a degree of polymerisation of at least 200 and originating, for example, from waste fibres or films of regenerated cellulose or alkali cellulose, which has been neutralised and washed.

The acrylonitrile polymers or acrylic polymers of the present invention are polymers containing at least 50% by weight of acrylonitrile units, and preferably at least 85% of acrylonitrile units. The remainder of the polymer, that is, up to 50% by weight, and preferably only up to 15% by weight, may be units derived from one or more copolymerisable ethylenically unsaturated monomers, and especially those ethylenically unsaturated monomers which are normally copolymerised with acrylonitrile, such as vinyl compounds, including, for instance, vinyl chloride and vinyl acetate, acrylic or methacrylic acid, acrylic or methacrylic acid esters and acrylamide or methacrylamide, and methacrylonitrile. Other ethylenically unsaturated monomers which can be utilized include compounds having a carboxylic acid group, such as itaconic acid, or compounds having a sulphonic acid group, such as vinylsulphonic acid compounds, allyl- and methallyl-sulphonic acids, sulphonated aromatic derivatives, styrene-sulphonic acid, vinyloxyarenesulphonic acids, vinyl deriatives of the basic type, such as vinylpyridine and its alkylated derivatives, and vinyl dialkylamine ethers, and the like. Mixtures of varying proportions of acrylonitrile copolymers listed above may be utilized, including mixtures with acrylonitrile homopolymers. The polymers are, of course, in the film forming molecular weight range.

The starting cellulose, having a degree of polymerisation of at least 200, is cut up, dried if necessary, and then pre-swollen in DMSO (dimethylsulphoxide) which has been previously dried if required. Thereafter the formaldehyde, preferably in the form of paraformaldehyde, is added to the mixture, and the temperature is raised to a value which is preferably within the range of 90° to 140° C., in accordance with the process described in commonly assigned published French Application No. 2,358,435, published on Feb. 10, 1978, the disclosure of which is hereby incorporated by reference.

The weight ratio of formaldehyde/cellulose largely depends upon the particular cellulose which is used. That is, the lower the accessibility of the cellulose employed, the higher the ratio of formaldehyde/cellulose which is preferably used. In practice, in order to dissolve cellulose I, a weight ratio of formaldehyde/cellulose of at least 1 is preferably utilized, whereas for cellulose II, it is possible to use a ratio of at least 0.6 at the dissolution stage. In order to facilitate subsequent conversion, the ratio of formaldehyde/cellulose can be reduced, if desired, after dissolution, to a value of between 0.2 and 2 by removing the formaldehyde by any known means, such as entrainment by means of an anhydrous and preferably inert gas, or distillation under reduced pressure, without risk of gel formation or coagulation, provided, however, that the ratio of formaldehyde/cellulose is always at least equal to 0.2.

Preferably the formaldehyde used in the present invention is in the form paraformaldehyde.

It is desired that the water content of the various reactants be low, for instance, that the water content of the cellulose is less than 1%, that of the dimethylsulphoxide be less than or equal to 1%, and that of the paraformaldehyde be less than 4% by weight.

The solution of the acrylic polymer in dimethylsulphoxide can be prepared in the cold, under ambient conditions, or under the action of heat, depending upon the particular case, simply while stirring, and the two polymeric solutions can then be mixed while stirring, at the indicated weight ratio of cellulose/acrylic polymer of between 0.05 and 1. This mixing of two polymeric solutions is preferably used when the polymer concentration is relatively low, that is, generally from about 12 to 18% by weight.

In order to obtain polymeric solutions having a higher polymer concentration (up to 30% by weight) or, in the case of cellulose solutions of high viscosity (high degree of polymerisation and/or high concentration), it is generally preferred to add the acrylic polymer directly in powder form, either to the cellulose solution prepared as described above, or to a powder produced by crystallising a cellulose solution prepared as described above, by cooling the cellulose solution to a temperature below 17° C., preferably between 0° and 5° C.

The two powders are then mixed, for example in a malaxating extruder, at a temperature between 90° and 150° C.

The solutions of the present invention can be modified before they are shaped or spun, in order to improve the properties of the resulting articles. For instance, a minor proportion of an additive such as dyes, pigments, flame-proofing agents such as, for instance, polymerised phosphorus and/or sulphur containing compounds, and the like, may be added using conventional techniques to the solutions of the present invention.

The solutions of the present invention can be used to produce quite diverse articles, such as yarns, fibres, films, sheets, coatings and the like.

The solutions of the present invention which are suitable for spinning are those solutions which have a total polymer concentration of between 12 and 30% by weight, a ratio of cellulose/acrylic polymer of between 0.05 and 1 and a water content of less than 5,000 ppm. However, in order to conduct the spinning operation profitably on an industrial scale, and to obtain fibres having good characteristics, the polymer concentration should be at least 18% by weight, preferably between 18 and 26% by weight, and the ratio of cellulose/acrylic polymer should be between 0.1 and 1. These solutions can be spun dry in accordance with any process known to those skilled in the art, for example, in accordance with the process of published French Patent Application No. 2,372,251, published on June 23, 1978, the disclosure of which is hereby incorporated by reference. Preferably, however, the solutions of the present invention are spun into a coagulating bath which consists essentially of water and dimethylsulphoxide in respective proportions of between 25/75 and 80/20 by volume, with the bath maintained at a temperature between 0° and 40° C. The filaments are subjected to a molecular orientation, which can be carried out in the coagulating bath, or subsequent to the coagulating bath, by drawing in one or more stages, for example in air, in an aqueous bath, or in both the latter in succession.

After the filaments have left the coagulating bath, they are freed of solvent by washing with water before, during or after drawing. The washing can also be conducted using dilute ammonia solutions, in order to prevent the strands from sticking. In this instance, the filaments can advantageously be washed with water and then sized and dried.

For a ratio of cellulose/acrylonitrile polymer of between about 0.05 and 0.1, the yarns and fibres produced according to present invention comprise a continuous three-dimensional system consisting of an acrylonitrile polymer of which the fibrils, which are orientated approximately in the direction of the axis of the fibre, and are in the form of a continuous three-dimensional system, are closely intermixed with cellulose fibrils which are orientated approximately along the axis of the fibre but remain discontinuous. For a ratio of cellulose/acrylic polymer of between 0.1 and 1, however, the cellulose fibrils become denser and also form a continuous three-dimensional system. The cellulose macromolecules in all cases are partially involved in a three-dimensional crystal lattice characteristic of cellulose II.

The yarns and fibres of the present invention, obtained from the solutions of the present invention, simultaneously possess good mechanical properties, a good absorption capacity, good dyeing affinity, and excellent antistatic properties. The water retention capacity of the yarns and fibres of the present invention may be determined in accordance with DIN Standard Specification 53-814. The water retention capacity is at least 20, preferably at least 30, and normally will lie between 20 and 80, more preferably between 30 and 80. In contrast, the water retention capacity of acrylic fibres containing no cellulose will be in the order of 5-6. This characteristic makes the fibres very comfortable to wear, since they rapidly absorb body moisture, which can then evaporate from the surface of textile.

Using solutions of the present invention, it is also possible to obtain films, sheets, coatings and the like, in accordance with any known process.

DESCRIPTION OF THE DRAWINGS

The invention will be more clearly understood with reference to the accompanying figures, wherein

FIG. 1: ratio cellulose/acrylic polymer 0.05
FIG. 2: ratio cellulose/acrylic polymer 0.1
FIG. 3: ratio cellulose/acrylic polymer 0.2
FIG. 4: ratio cellulose/acrylic polymer 0.4

EXAMPLES OF THE INVENTION

Figure 1:
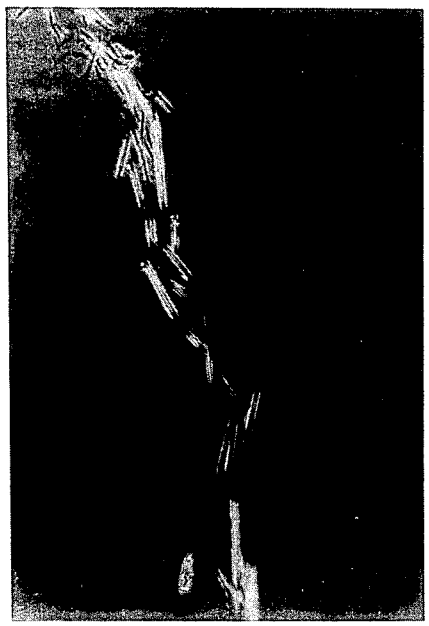
FIGS. 1 to 4 show (magnification of 200 X) the fibrillar cellulose system by itself, obtained after dissolving the acrylic constituent from the fibres, of fibres obtained from solutions containing increasing proportions of cellulose/acrylic polymer, as follows.

The invention will be understood more readily from the following examples, wherein parts and percentages are by weight unless indicated otherwise.

EXAMPLE 1

106 g of bleached "Kraft" paper wood pulp, having a cellulose degree of polymerization of 1050 and a moisture content of 6%, were completely dried in an oven and then introduced into 1467 g of dimethylsulphoxide containing 230 ppm of water. Thereafter 124.8 g of 96% pure paraformaldehyde was added to the mixture, with a resulting formaldehyde/cellulose weight ratio of 1.2.

The mixture was heated for 6 hours 135° C. while stirring, and thereafter a portion of the formaldehyde was removed by continuous passage through a thin film evaporator in vacuuo until a weight ratio of formaldehyde/cellulose of 0.40 was obtained, resulting in a solution having a viscosity of 2200 poises at 20° C.

The solution was then cooled to 85° C. and thereafter a solution of an acrylonitrile polymer, which was a copolymer containing 91.4% by weight of acrylonitrile, 7.75% by weight of methyl methacrylate and 0.85% by weight of sodium methallylsulphonate in dimethylsulphoxide (at a concentration of 23% by weight of polymer) was added so as to obtain a weight ratio of cellulose/acrylic polymer of 0.05. The mixture of the two solutions was malaxated for 1 hour at 85° C., and then the resulting homogeneous solution, containing 20.4% by weight of polymer, was extruded through a spinneret having 200 orifices, each orifice of diameter of 0.055 mm, into a coagulating bath maintained at 5° C. The coagulating bath consisted of dimethylsulphoxide and water in respective portions of 55/45 by volume.

Upon leaving the coagulating bath, the yarns were taken up and then drawn in air at the ambient temperature, between two pairs of rollers, in a ratio of 1.3 X, washed with water on the second pair of rollers, and drawn again in a bath of boiling water in a ratio of 4.1 X. The final yarn speed was 55 m/minute. The sized and dried filaments had the following characteristics:

Gauge per strand: 1.7 dtex
Tensile strength: 28 g/tex
Elongation: 21%
Water retention capacity: 22.

EXAMPLE 2

106 g of prehydrolysed sulphate pulp, having a cellulose degree of polymerization of 430 and a moisture content of 6%, were completely dried in an oven and homogeneously mixed with 436 g of dimethylsulphoxide, containing 300 ppm of water, and 135 g of paraformaldehyde (corresponding to a ratio paraformaldehyde/cellulose of 1.3). The resulting mixture was heated for 8 hours at 110° C. and then for 7 hours at 135° C., while stirring.

A portion of the formaldehyde was then removed, as in Example 1, so as to obtain a ratio of formaldehyde/cellulose of 0.47. The solution thus obtained, which had a viscosity of 4400 poises at 90° C., was cooled to a temperature of 3° C., powdered and mixed cold with a dry acrylonitrile polymer having a composition identical to that described in Example 1, so as to produce a ratio of cellulose/acrylic polymer of 1. The polymer concentration in the solution was 29.3% by weight. The mixture was passed through a twin-screw degassing extruder at a temperature of 130° C. and was then extruded through a spinneret having 200 holes, each of a diameter of 0.055 mm, at 90° C., into a coagulating bath maintained at 5° C., and containing dimethylsulphoxide and water in a 55/45 proportion by volume.

The filaments were successively subjected to drawing in air at ambient temperature in a ratio of 1.3 X, washed with water at ambient temperature and drawn in boiling water in a ratio of 4 X. The final yarn speed was 40 m/minute. The resulting filaments, after sizing and drying, had the following characteristics:

Gauge per strand: 3.3 dtex

Tensile strength: 21 g/tex
Elongation: 15%
Water retention capacity: 72.

EXAMPLE 3

106 g of bisulphite pulp, having a cellulose degree of polymerization of 770 and a moisture content of 6%, were completely dried in an oven and then introduced into 885 g of dimethylsulphoxide containing 520 ppm of water. 125 g of 96% pure paraformaldehyde were added so as to obtain a ratio of paraformaldehyde/cellulose of 1.20. The resulting mixture was heated for 6 hours at 135° C. while stirring. After that time, the cellulose was dissolved in solution, and thereafter the ratio of paraformaldehyde/cellulose was reduced to 0.35 in the same manner as in Example 1. The resulting solution had a viscosity of 400 poises at 85° C.

After cooling to ambient temperature, 250 g of an acrylonitrile polymer which was identical to that described in Example 1 was added to the cellulose solution, so as to obtain a weight ratio of cellulose/acrylic polymer of 0.4. The mixture was malaxated for 1 hour at ambient temperature, and then 200 g of dimethylsulphoxide were added to the mixture, and the resulting mixture was malaxated again for 1 hour at 85° C.

The resulting homogeneous solution, which had a total polymer concentration of 23.8% by weight, was extruded through a spinneret having 200 orifices, each of diameter of 0.055 mm, into a coagulating bath containing dimethylsulphoxide and water (55/45 proportion by volume) and maintained at 5° C. The filaments leaving the coagulating bath were drawn in air in a ratio of 1.07 X, washed with water at ambient temperature and drawn in boiling water in a ratio of 4.1 X. The final yarn speed was 60 m/minute. The resulting filaments, after sizing and drying, had the following properties:

Gauge per strand: 3.3 dtex
Tensile strength: 25 g/tex
Elongation: 14%
Water retention capacity: 48.

EXAMPLE 4

106 g of prehydrolysed sulphate "Kraft" paper pulp, having a cellulose degree of polymerization of 500 and a moisture content of 6%, were completely dried in an oven and then introduced into 1440 g of dimethylsulphoxide containing 550 ppm of water. 125 g of 96% pure paraformaldehyde were added so as to obtain a ratio of paraformaldehyde/cellulose of 1.20.

The resulting mixture was heated for 5 hours at 135° C. while stirring. After the cellulose dissolved, some of the formaldehyde was removed by bubbling a stream of dry nitrogen through the solution at 120° C., and by this means the ratio of formaldehyde/cellulose was lowered to 0.25.

The resulting solution, which has viscosity of 410 Poises at 20° C., was cooled to ambient temperature and then 500 g of an acrylonitrile polymer which was identical to the acrylic polymer used in Example 1 was added in powder form to the solution so as to obtain a ratio of cellulose/acrylonitrile of 0.2. The mixture was malaxated for 1 hour under ambient conditions, and then 250 g of dimethylsulphoxide were added to the mixture, and then the mixture was malaxated again for 1 hour at 85° C. The resulting solution, containing 25.9% by weight of polymer, was extruded at 75° C. through a spinneret having 200 orifices, each of diameter of 0.055 mm, into a coagulating bath maintained at 5° C. and consisting of a mixture of dimethylsulphoxide and water in a proportion of 55/45 by volume. The filaments were extracted from the coagulating bath by positively driven mechanical device and drawn in air in a ratio of 1.4 X, washed by counter-current flow water under ambient conditions and drawn in boiling water at a ratio of 4.1 X. The final filament speed was 60 m/minute. The properties of the resulting yarns, after being sized and dried, is set forth in Table 1 below.

EXAMPLES 5–9

Example 4 was repeated, with identical solutions extruded through the same spinneret, but into coagulating baths having different compositions and at different temperatures, and under different drawing conditions, with the differences in conditions, and the characteristics of the resulting filaments, are set forth in Table 1 below.

TABLE 1

| | | Examples | | | | | |
|---|---|---|---|---|---|---|---|
| | | 4 | 5 | 6 | 7 | 8 | 9 |
| Coagulating bath | Proportion of DMSO/water | 55/45 | 55/45 | 70/30 | 70/30 | 35/65 | 35/65 |
| | Temperature °C. | 5 | 35 | 5 | 15 | 5 | 35 |
| Drawing ratio | Drawing in air | 1.4 | 1.4 | 1.17 | 1.17 | 1 | 1 |
| | Drawing in boiling water | 4.1 | 4.1 | 4.9 | 4.9 | 5.5 | 5.5 |
| Final speed m/minute | | 60 | 60 | 50 | 50 | 55 | 55 |
| Tensile strength g/tex | | 30 | 26 | 31 | 28 | 29 | 27 |
| Elongation % | | 16 | 15 | 16 | 15 | 16 | 16 |
| Water retention capacity | | 40 | 38 | 41 | 43 | 44 | 40 |

EXAMPLE 10

106 g of prehydrolyzed sulphate "kraft" pulp, having a cellulose degree of polymerisation of 500 and a moisture content of 6%, were completely dried in an oven and then introduced into 1,440 g of dimethylsulphoxide containing 550 ppm of water. 125 g of 96% pure paraformaldehyde were added to the mixture so as to obtain a ratio of paraformaldehyde/cellulose of 1.20. The mixture was heated for 5 hours at 135° C. and then cooled to ambient temperature. Then 500 g of a dry powdered acrylonitrile polymer, containing 94.15% by weight of acrylonitrile units, 5% by weight of methyl methacrylate units and 0.85% by weight of sodium methallylsulphonate units, were added so as to obtain a ratio of cellulose/acrylic polymer of 0.2. The mixture was malaxated for 1 hour under ambient conditions, 250 g of dimethylsulphoxide were then added, and then the mixture was malaxated again for 1 hour at 85° C. The resulting solution, containing 24.8% by weight of polymer, was extruded at 75° C. through a spinneret having 200 orifices each of a diameter of 0.055 mm into a coagulating bath maintained at 5° C. and containing a mixture of dimethylsulphoxide and water in a proportion of 55/45 by volume.

The filaments were extracted from the coagulating bath by a positively driven mechanical device and then drawn in air at ambient temperature in a ratio of 1.05 X and washed, during the air drying, by spraying with an aqueous ammonia solution having a concentration of 30 g/litre. The filaments were subsequently passed through an intermediate tank containing an aqueous ammonia solution having a concentration of 30 g/litre, and then drawn again in boiling water in a ratio of 4.1 X, washed, sized and dried. The resulting filaments possessed the characteristics indicated in Table 2 below.

EXAMPLES 11 AND 12

Polymer solutions identical to the solution described in Example 10 were extruded under the same conditions as in Example 10 into coagulating baths, having compositions and temperatures indicated in Table 2 below. The filaments were treated under the drawing conditions identical to Example 10, with the exception of those conditions set forth in Table 2, with the properties of the resulting filaments set forth in Table 2 below.

TABLE 2

|  |  | Examples | | |
|---|---|---|---|---|
|  |  | 10 | 11 | 12 |
| Coagulation bath | Proportion of DMSO/water | 55/45 | 70/30 | 70/30 |
|  | Temperature °C. | 5 | 25 | 35 |
| Drawing ratio | Drawing in air | 1.05 | 1.07 | 1.04 |
|  | Drawing in boiling water | 4.1 | 4.9 | 5.2 |
| Final speed in m/minute |  | 50 | 50 | 50 |
| Properties | Tensile strength g/tex | 25 | 25 | 26 |
|  | Elongation % | 14 | 13.5 | 15 |
|  | Water retention capacity | 42 | 39 | 40 |

EXAMPLE 13

Example 4 was repeated, using an identical cellulose solution, and with an acrylonitrile homopolymer in place of the acrylic polymer of Example 4, but with the polymers in the same proportions, and with 935 g of dimethylsulphoxide, instead of the 250 g of Example 4, added after malaxation under ambient conditions. The filaments were extruded and drawn in the same manner as in Example 4, except that the temperature of the coagulating bath was 15° C. The filaments possess the following properties:
Tensile strength: 28 g/tex
Elongation: 14%
Water retention capacity: 41.

EXAMPLE 14

Example 4 was repeated, using the same cellulose solution, with the acrylonitrile polymer of Example 4 replaced by an identical proportion of a copolymer having the following composition:
acrylonitrile: 92.70 parts by weight
vinyl acetate: 6.60 parts by weight
sodium methallylsulphonate: 0.70 parts by weight
The resulting solution was extruded under the conditions of Example 4 into a coagulating bath containing a mixture of dimethylsulphoxide and water in proportions of 35/65 by volume, and maintained at 25° C. The resulting filaments were treated as in Example 4, but the draw ratio in air was reduced to 1 X (which meant that no drawing took place during the passage in air). The air draw step was followed by washing with water at ambient temperature, and drawing in boiling water in a ratio of 5.5 X, sizing and drying. The resulting filament had the following characteristics:
Tensile strength: 28 g/tex
Elongation: 15%
Water retention capacity: 39.

EXAMPLE 15

106 g of prehydrolysed sulphate "kraft" pulp, having a cellulose degree of polymerisation of 500 and a moisture content of 6%, were completely dried in an oven and then introduced into 1,440 g of dimethylsulphoxide containing 550 ppm of water. 125 g of 96% pure paraformaldehyde were added so as to obtain a ratio of paraformaldehyde/cellulose of 1.20.

The resulting mixture was heated for 5 hours at 135° C. while stirring to dissolve the cellulose. After dissolution, some of the paraformaldehyde was removed by bubbling a stream of dry nitrogen at 120° C. through the solution, so that the ratio of formaldehyde/cellulose was lowered to 0.25.

The resulting solution, which had a viscosity of 410 Poises at 20° C., was cooled, and 1,000 g of a dry acrylonitrile polymer, which was identical to the acrylic polymer of Example 1, was added in powder form, so as to obtain a ratio of cellulose/acrylonitrile polymer of 0.1. The mixture was malaxated for 1 hour under ambient conditions, 3,545 g of dimethylsulphoxide were added, and then the mixture was malaxated for 1 hour at 85° C. The resulting solution, containing 18% by weight of polymer, was extruded at 75° C. through a spinneret having 200 orifices of 0.055 mm diameter into a coagulating bath maintained at 5° C. and consisting of a mixture of dimethylsulphoxide and water in a volume proportion of 55/45. The filaments were extracted from the coagulating bath by a positively driven mechanical device and then drawn in air in a ratio of 1.1 X, washed countercurrently and drawn in boiling water in a ratio of 4 X, sized and dried. The filament speed was 50 m/minute. The resulting filaments had the following properties:
Gauge per strand: 3.3 dtex
Tensile strength: 23 g/tex
Elongation: 17%
Water retention capacity: 33.

EXAMPLE 16

106 g of prehydrolyzed sulphate pulp, having a cellulose degree of polymerisation of 500 and a moisture content of 6%, were completely dried in an oven and then homogeneously mixed with 1,500 g of dimethylsulphoxide containing 500 ppm of water. 125 g of 96% pure paraformaldehyde were added to the mixture in order to obtain a ratio of paraformaldehyde/cellulose of 1.2. The mixture was heated for 6 hours at 135° C. to dissolve the cellulose. After dissolution, the ratio of paraformaldehyde/cellulose was reduced to 0.30 by passage through a thin film evaporator in vacuo at 130° C.

Thereafter 2,000 g of an acrylonitrile polymer, consisting of 91.4% by weight of acrylonitrile units, 7.75% by weight of methyl methacrylate units and 0.85% by weight of sodium methallylsulphonate units, were added to the cellulose solution so as to obtain a ratio of cellulose/acrylic polymer of 0.05. The mixture was malaxated for 1 hour under ambient conditions, 7,970 g of dimethylsulphoxide were then added to the mixture, and the resulting mixture was malaxated again for 1 hour at 85° C.

The resulting solution, which had a total polymer concentration of 18% by weight, was extruded at 75° C. through a spinneret having 200 orifices, each of diameter of 0.055 mm, into a coagulating bath containing dimethylsulphoxide and water in a volume proportion of 55/45 and maintained at 5° C. The filaments leaving the coagulating bath were drawn in air in a ratio of 1.2, washed with water and then drawn in boiling water in a ratio of 4.1. The final filament speed was 60 m/minute. After washing with water, sizing and drying, the resulting filaments had the following properties:

Gauge per strand: 3.3 dtex
Tensile strength: 24 g/tex
Elongation: 16%
Water retention capacity: 23.

The acrylic polymer phase of the resulting filaments was dissolved, and the cellulose phase appeared in the form of discontinuous fibrils as shown in FIG. 1.

EXAMPLE 17

106 g of prehydrolysed sulphate pulp, having a cellulose degree of polymerisation of 500 and a moisture content of 6%, were completed dried in an oven then homogeneously mixed with 1,500 g of dimethylsulphoxide containing 500 ppm of water. 125 g of 96% pure paraformaldehyde were added in order to obtain a ratio of paraformaldehyde/cellulose of 1.2. The resulting mixture was heated for 6 hours at 135° C. to dissolve the cellulose. After dissolution, the ratio of formaldehyde/cellulose was reduced to 0.30 by passage through a thin film evaporator, in vacuo, at 130° C. Thereafter, 1,000 g of an acrylonitrile polymer, containing 91.4% by weight of acrylonitrile, 7.75% by weight of methyl methacrylate, and 0.85% by weight of sodium methallyl-sulphonate, were added to the cellulose solution so as to obtain a ratio of cellulose/acrylic polymer of 0.1. The mixture was malaxated for 1 hour under ambient conditions, and 2,870 g of dimethylsulphoxide were then added. Thereafter the resulting mixture was malaxated again for 1 hour at 85° C.

The resulting solution, which had a total polymer concentration of 20% by weight, was extruded at 75° C. through a spinneret having 200 orifices, each having a diameter of 0.055 mm, into a coagulating bath containing dimethylsulphoxide and water in a volume proportion of 55/45 and maintained at 5° C. The filaments leaving the coagulating bath were drawn in air in a ratio of 1.3, washed with water and then drawn in boiling water in a ratio of 4.3. The final speed of the filaments was 60 m/minute. After washing with water, sizing and drying, the resulting filaments had the following properties:

Gauge per strand: 3.3 dtex
Tensile strength: 31 g/tex
Elongation: 16%
Water retention capacity: 30.

Figure 2:
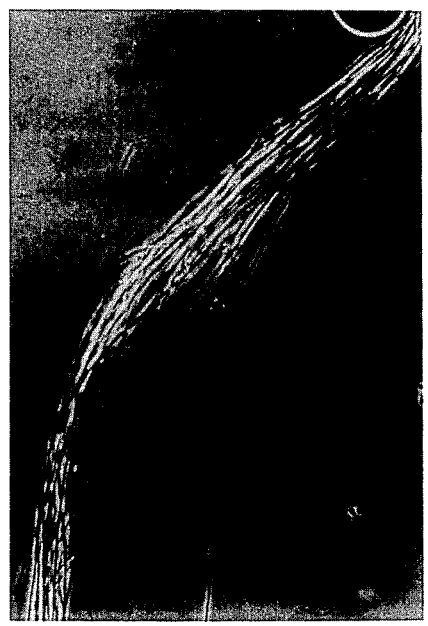

After dissolving the acrylic polymer phase from the resulting filaments, the cellulose phase appeared in the form of a system illustrated in FIG. 2.

EXAMPLE 18

106 g of prehydrolysed sulphate pulp, having a cellulose degree of polymerisation of 500 and a moisture content of 6% were completely dried in an oven and then homogeneously mixed with 1,200 g of dimethylsulphoxide containing 550 ppm of water. 125 g of 96% pure paraformaldehyde were added in order to obtain a ratio of paraformaldehyde/cellulose of 1.2. The mixture was heated for 6 hours at 135° C. to dissolve the cellulose. After this dissolution the ratio of formaldehyde/cellulose was reduced to 0.30 by passage through a thin film evaporator, in vacuo, at 130° C.

Thereafter, 500 g of acrylonitrile polymer, consisting of 91.4% by weight of acrylonitrile units, 7.75% by weight of methyl methacrylate units and 0.85% by weight of sodium methallylsulphonate units, were added to the cellulose solution so as to obtain a ratio of cellulose/acrylic polymer of 0.2. The mixture was malaxated for 1 hour under ambient conditions, and then 1,175 g of dimethylsulphoxide were added, and thereafter the mixture was malaxated again for 1 hour at 85° C.

The resulting solution, having a total polymer concentration of 20% by weight, was extruded at 75° C. through a spinneret having a 200 orifices, each of a diameter of 0.055 mm, into a coagulating bath containing dimethylsulphoxide and water in a volume proportion of 55/45 and maintained at 5° C. The filaments leaving the coagulating bath were drawn in air in a ratio of 1.4, washed with water and then drawn in boiling water in a ratio of 4.2. The final filament speed was 60 m/minute. After washing with water, sizing and drying, the resulting filaments had the following properties:

Gauge per strand: 3.3 dtex
Tensile strength: 30 g/tex
Elongation: 15%
Water retention capacity: 40.

Figure 3:
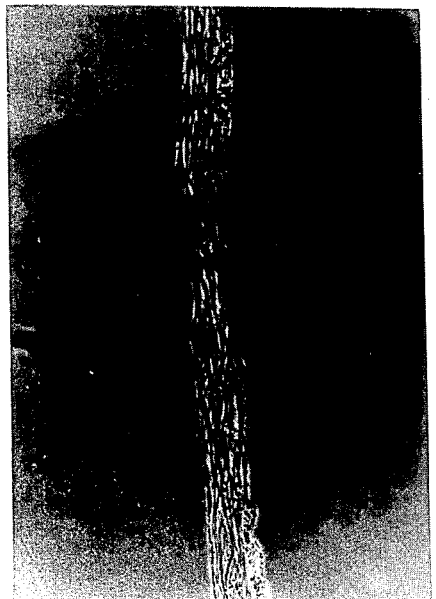

The acrylic polymer phase was dissolved from the resulting filaments, with the cellulose phase remaining appearing in the form of a system illustrated in FIG. 3.

EXAMPLE 19

106 g of prehydrolysed sulphate pulp, having a cellulose degree of polymerisation of 500 and a moisture content of 6% by weight was completed dried in an oven and then homogeneously mixed with 200 g of dimethylsulphoxide containing 500 ppm of water. 125 g of of 96% pure paraformaldehyde were added in order to obtain a ratio of paraformaldehyde/cellulose of 1.2. The mixture was heated for 6 hours at 135° C. to dissolve the cellulose. After this dissolution, the ratio of paraformaldehyde/cellulose was reduced to 0.30 by passage through a thin film evaporator, in vacuo, at 130° C.

Thereafter, 250 g of an acrylonitrile polymer, consisting of 91.4% by weight of acrylonitrile units, 7.75% by weight of methyl methacrylate units and 0.85% by weight of sodium methallylsulphonate units, was added to the cellulose solution so as to obtain a ratio of cellulose/acrylic polymer of 0.4. The mixture was malaxated for 1 hour under ambient conditions, 200 g of dimethylsulphoxide were then added to the mixture, and the resulting mixture was malaxated again for one hour at 85° C.

The resulting solution, having a total polymer concentration of 24% by weight, was extruded at 80° C. through a spinneret having 200 orifices, each of a diameter of 0.055 mm, into a coagulating bath maintained at 5° C. and containing dimethylsulphoxide and water in a volume proportion of 55/45. The filaments leaving the coagulating bath were drawn in air in a ratio of 1.1, washed with water and then drawn in boiling water in a ratio of 4.05, with a final filament speed of 60 m/minute. After washing with water, sizing and drying, the resulting filaments had the following properties:

Gauge per strand: 3.3 dtex
Tensile strength: 24 g/tex
Elongation: 15%
Water retention capacity: 52.

Figure 4:
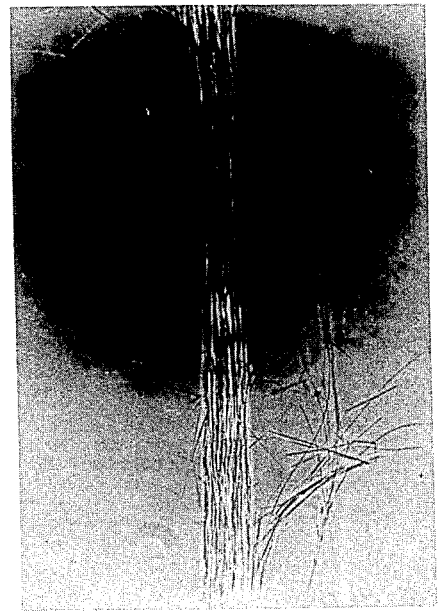

After dissolving the acrylic polymer phase from the resulting filaments, the remaining cellulose phase appeared in the form of a continuous three-dimensional system shown in FIG. 4.

Figure 5:
FIG. 5 illustrates (magnification 6,000 X) a sectional view of the complete yarn or FIG. 4, prior to the acrylic constituent dissolving step. The yarn contains two fibrillar systems, which can be clearly seen.

A cross sectional view of the resulting filament (with no acrylic polymer phase being dissolved therefrom) is shown in FIG. 5, which clearly reveals the two systems, the clearer system being that of the cellulose phase.

In Examples 16–19, in the preparation of samples of the cellulose phase, by dissolving the acrylonitrile polymer phase from the filaments, to produce the system illustrated in FIGS. 1–4, the acrylonitrile polymer phase was dissolved by dispersing the samples in dimethylformamide.

We claim:

1. Shapable polymeric solution, said solution consisting essentially of (a) cellulose having a degree of polymerisation of at least 200, (b) an acrylonitrile polymer, (c) dimethylsulfoxide and (d) formaldehyde,
   the weight ratio of cellulose/acrylonitrile polymer being between 0.1 and 1,
   the weight ratio of formaldehyde/cellulose being between 0.2 and 2,
   and the total polymer concentration in the solution being between 18 and 30% by weight.

2. Solution of claim 1, wherein said acrylonitrile polymer contains at least 85% by weight of acrylonitrile units and 0 to 15% by weight of at least 1 copolymerisable ethylenically unsaturated comonomer unit.

3. Solution of claim 1 wherein the total polymer concentration in said solution is between 18 and 26% by weight.

4. Solution of claim 1 wherein the water content of said solution is less than 5,000 ppm.

5. Process for the preparation of shapable solutions, said process comprising adding an acrylonitrile polymer powder to cellulose in a mixture of dimethylsulfoxide and formaldehyde, said cellulose having a degree of polymerisation of at least 200 and being previously dried, the weight ratio of cellulose/acrylonitrile polymer being between 0.1 and 1.

6. Process according to claim 5, wherein the cellulose is in the form of a powder prepared by cooling a solution of cellulose in dimethylsulfoxide and formaldehyde to a temperature below 17° C.

7. Process of claim 6, wherein the cellulose powder and the acrylonitrile powder are mixed together and then heated to a temperature between 90° and 150° C.

* * * * *